(12) United States Patent
Ozaki

(10) Patent No.: US 8,909,406 B2
(45) Date of Patent: Dec. 9, 2014

(54) ELECTRIC AUTOMOBILE

(75) Inventor: Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/985,925

(22) PCT Filed: Feb. 10, 2012

(86) PCT No.: PCT/JP2012/053058
§ 371 (c)(1),
(2), (4) Date: Aug. 16, 2013

(87) PCT Pub. No.: WO2012/114899
PCT Pub. Date: Aug. 30, 2012

(65) Prior Publication Data
US 2013/0325239 A1 Dec. 5, 2013

(30) Foreign Application Priority Data

Feb. 25, 2011 (JP) ................. 2011-039412

(51) Int. Cl.
| | |
|---|---|
| *B60L 11/00* | (2006.01) |
| *B60L 3/04* | (2006.01) |
| *B60T 7/12* | (2006.01) |
| *B60T 17/22* | (2006.01) |
| *B60K 7/00* | (2006.01) |
| *B60K 17/04* | (2006.01) |
| *B60K 17/356* | (2006.01) |
| *B60L 3/00* | (2006.01) |
| *B60T 8/32* | (2006.01) |

(52) U.S. Cl.
CPC ... *B60L 3/04* (2013.01); *B60T 7/12* (2013.01); *B60T 17/22* (2013.01); *B60K 7/0007* (2013.01); *B60K 17/046* (2013.01); *B60K 17/356* (2013.01); *B60L 3/003* (2013.01); *B60L 3/0061* (2013.01); *B60T 8/3255* (2013.01); *B60T 8/329* (2013.01); *Y02T 10/7258* (2013.01); *B60K 2007/0038* (2013.01); *B60K 2007/0092* (2013.01); *B60T 2270/402* (2013.01); *B60T 2270/406* (2013.01); *Y02T 10/648* (2013.01)
USPC .......................................................... 701/22

(58) Field of Classification Search
USPC ...................................................... 701/22, 36
See application file for complete search history.

(56) References Cited

U.S. PATENT DOCUMENTS

| | | | | |
|---|---|---|---|---|
| 5,915,488 A | * | 6/1999 | Fliege ........................ | 180/65.22 |
| 6,888,729 B2 | * | 5/2005 | Maekawa et al. .......... | 363/56.02 |

(Continued)

FOREIGN PATENT DOCUMENTS

| | | |
|---|---|---|
| JP | 7-298418 | 11/1995 |
| JP | 2000-134703 | 5/2000 |

(Continued)

OTHER PUBLICATIONS

PCT International Preliminary Report on Patentability mailed Sep. 6, 2013 in corresponding International Application No. PCT/JP2012/053058.

(Continued)

*Primary Examiner* — Yonel Beaulieu

(57) ABSTRACT

An electric vehicle includes a malfunction detector configured to continuously monitor a torque command from an ECU as well as one of the followings: signals indicating a rotational frequency of a motor unit; signals indicating a rotational frequency of a wheel driven by the motor unit; signals indicating a rotational direction of the motor unit; signals indicating a rotational direction of the wheel driven by the motor unit; and a motor current, and detect, according to a predefined rule, a malfunction of the motor unit, based on the monitoring information. The electric vehicle also includes a malfunction-responsive controller configured to cause at least one of shut-off of a drive current to the motor unit and braking with a mechanical brake, if the malfunction detector detects a malfunction.

8 Claims, 8 Drawing Sheets

(56) References Cited

U.S. PATENT DOCUMENTS

| | | | |
|---|---|---|---|
| 7,200,482 B2 | 4/2007 | Kawarasaki | |
| 2004/0178008 A1 | 9/2004 | Kawarasaki | |
| 2006/0237256 A1* | 10/2006 | Sasaki et al. | 180/442 |
| 2008/0236959 A1* | 10/2008 | Hashida et al. | 188/72.2 |
| 2013/0045827 A1* | 2/2013 | Kobayashi et al. | 475/149 |
| 2014/0001987 A1* | 1/2014 | Okada | 318/370 |
| 2014/0020966 A1* | 1/2014 | Lee | 180/55 |

FOREIGN PATENT DOCUMENTS

| | | |
|---|---|---|
| JP | 2004-215350 | 7/2004 |
| JP | 2005-328680 | 11/2005 |
| JP | 2006-258289 | 9/2006 |
| JP | 2008-92708 | 4/2008 |
| JP | 2008-172935 | 7/2008 |

OTHER PUBLICATIONS

U.S. Appl. No. 14/000,373, filed Aug. 19, 2013, Takayoshi Ozaki, NTN Corporation.
U.S. Appl. No. 14/000,364, filed Aug. 19, 2013, Takayoshi Ozaki, NTN Corporation.
U.S. Appl. No. 14/000,379, filed Aug. 19, 2013, Takayoshi Ozaki, NTN Corporation.
U.S. Appl. No. 14/000,295, filed Aug. 19, 2013, Takayoshi Ozaki, NTN Corporation.
U.S. Appl. No. 14/000,783, filed Aug. 21, 2013, Takayoshi Ozaki, NTN Corporation.
International Search Report mailed May 1, 2012 in corresponding International Application No. PCT/JP2012/053058.
Japanese Notice of Reason(s) for Rejection in corresponding Japanese Patent Application No. 2011-039412.

\* cited by examiner

ELECTRIC AUTOMOBILE

CROSS REFERENCE TO THE RELATED APPLICATIONS

This application is a U.S. national stage application of PCT/JP2012/053058, filed Feb. 10, 2012 and claims foreign priority benefit of Japanese patent application No. 2011-039412, filed Feb. 25, 2011 in the Japanese Intellectual Property Office, the contents of both of which are herein incorporated by reference as a part of this application.

BACKGROUND OF THE INVENTION

1. Field of the Invention

The present invention relates to an electric vehicle that may be equipped with in-wheel motor drive system(s) and that may be battery-powered or fuel cell-powered. In particular, the present invention relates to fail-safe control that is responsive to abnormalities in a motor.

2. Description of Related Art

In an electric vehicle, control of motor(s) is typically implemented with a microcomputer. A control system that can be used may include an ECU which is a primary electronic control unit configured to perform general control of the vehicle and may also include an inverter unit. Such an inverter unit may include a power circuitry including an inverter configured to convert a DC power from a battery unit into an AC power used to drive a motor unit, and may also include a motor control circuitry configured to control the power circuitry in accordance with a torque command from the ECU. Moreover, an electric vehicle may be equipped with in-wheel motor drive system(s) formed by a wheel bearing unit, a motor unit and a reducer unit.

[Patent Document 1] JP Laid-open Patent Publication No. 2008-172935

SUMMARY OF THE INVENTION

As noted above, control of motor(s) in an electric vehicle is typically implemented with a microcomputer. However, a microcomputer could be undesirably affected by electromagnetic noise or electrostatic noise, jeopardizing the normal operation of motor controllers. Reliability of motor controllers is an urgent issue, especially with a configuration in which the torque generated by a motor serving as a drive source for the electric vehicle is transmitted to a wheel by a reducer having a significant reduction ratio. Such a reducer may amplify torque generated by an unstably controlled motor and transmit it to a wheel.

An object of the present invention is to provide an electric vehicle which can quickly detect a malfunction of a motor, such as caused by noise in a control system, and correspondingly take safety measures. The general aspects of the present invention will now be described using the reference signs in the figures showing embodiments of the present invention.

SOLUTION TO PROBLEM(S)

The present invention may provide an electric vehicle which includes a motor unit 6 configured to drive a wheel 2, 3. The electric vehicle also includes an ECU 21 which is an electronic control unit configured to perform general control of the vehicle. The electric vehicle also includes an inverter unit 22. The inverter unit 22 includes a power circuitry 28 including an inverter 31 configured to convert a DC power from a battery unit into an AC power used to drive the motor unit 6 and a motor control circuitry 29 configured to control the power circuitry 28 in accordance with a torque command from the ECU 21. The electric vehicle also includes a mechanical brake 9, 10 configured to brake the wheel 2, 3. The electric vehicle also includes a malfunction detector 37 configured to continuously monitor the torque command from the ECU 21 as well as one of the followings: signals indicating a rotational frequency of the motor unit 6; signals indicating a rotational frequency of the wheel 2, 3 driven by the motor unit 6; signals indicating a rotational direction of the motor unit 6; signals indicating a rotational direction of the wheel 2, 3 driven by the motor unit 6; and a motor current, and detect, according to a predefined rule, a malfunction of the motor unit 6, based on the monitoring information. The electric vehicle also includes a malfunction-responsive controller 38 configured to cause at least one of shut-off or reduction of a drive current to the motor unit 6 and braking with the mechanical brake 9, 10, if the malfunction detector 37 detects a malfunction.

Preferably, braking with the mechanical brake 9, 10 includes not only braking of a wheel 2, 3 that is driven by a motor unit 6 experiencing abnormalities, but also braking of one or more of the other wheels 2, 3 equipped to the vehicle. For example, both of left and right wheels 2 or 3 preferably receive braking with the mechanical brakes 9 or 10, when a motor unit 6 associated with one of the left and right wheels 2 or 3 is determined to be experiencing abnormalities. The malfunction detector 37 and the malfunction-responsive controller 38 may be included in the ECU 21 or the inverter unit 22. The malfunction detector 37 and the malfunction-responsive controller 38 may be provided external to the ECU 21 and the inverter unit 22.

Electromagnetic noise or electrostatic noise may affect the motor control circuitry 29. In such a case, a torque command from the ECU 21 may accidentally result in a malfunction of a motor unit 6, such as a rotational direction abnormality or a rotational speed abnormality. The malfunction detector 37 may continuously monitor a torque command from the ECU 21 as well as one of the followings: signals indicating a rotational frequency of a motor unit 6; signals indicating a rotational frequency of a wheel 2, 3 driven by the motor unit 6; signals indicating a rotational direction of the motor unit 6; signals indicating a rotational direction of the wheel 2, 3 driven by the motor unit 6; and a motor current, and detect, according to a predefined rule, a malfunction of the motor unit 6, based on the monitoring information. The malfunction of the motor unit 6 that may be detected is, for example, a rotational direction abnormality or a rotational speed abnormality determined based on a torque command from the ECU 21. The malfunction-responsive controller 38 may cause at least one of shut-off of a drive current to the motor unit 6 and braking with the mechanical brake 9, 10, if the malfunction detector 37 detects a malfunction.

Such a configuration of continuously monitoring possible abnormalities in a motor unit 6 and causing at least one of shut-off of a drive current to the motor unit 6 and braking with the mechanical brake 9, 10, allows for quickly establishing safety by, for example, preventing travel of a vehicle in a direction opposite to a driver's intended direction and/or a driver's unintended acceleration of a vehicle.

In the present invention, the malfunction detector 37 may include a rotational direction command determiner 41 configured to determine, based on the torque command from the ECU 21, an intended rotational direction of the motor unit 6 and a rotational direction abnormality determiner 42 configured to compare the intended rotational direction with a rotational direction determined based on one of the followings:

signals indicating a rotational frequency of the motor unit 6; signals indicating a rotational frequency of the wheel 2, 3 driven by the motor unit 6; signals indicating a rotational direction of the motor unit 6; signals indicating a rotational direction of the wheel 2, 3 driven by the motor unit 6; and a motor current, to determine a rotational direction abnormality of the motor unit 6. A rotational direction abnormality of a motor unit 6 may result in travel of a vehicle in a direction opposite to a driver's intended direction, thus significantly lowering the safety. However, the aforementioned configuration allows for causing, in response to a rotational direction abnormality, at least one of shut-off of a current to a motor unit 6 and braking with the mechanical brake 9, 10, thus ensuring safety.

In the present invention, the malfunction detector 37 may include a rotational frequency estimator 43 configured to determine, based on the torque command from the ECU 21, an intended rotational frequency of the motor unit 6 and a rotational frequency abnormality determiner 44 configured to compare the intended rotational frequency with one of the followings: signals indicating a rotational frequency of the motor unit 6; and signals indicating a rotational frequency of the wheel 2, 3 driven by the motor unit 6, to determine a rotational frequency abnormality of the motor unit 6. Noise may cause a sudden acceleration of a vehicle against a driver's intention. However, the aforementioned configuration of determining a rotational frequency abnormality allows for ensuring safety by, for example, preventing such a sudden acceleration of a vehicle against a driver's intention.

In the present invention, when an electric vehicle includes a plurality of motor units 6 configured to drive respective different wheels 2, 3, preferably, the malfunction-responsive controller 38 is configured to cause, if a malfunction of one of the motor units 6 is detected, not only shut-off or reduction of a drive current to the motor unit 6 whose malfunction is detected but also shut-off or reduction of a drive current to one or more of the other motor units 6. A vehicle may include independent motor units 6 to drive different wheels 2, 3. Shut-off of a drive current to only one of such independent motor units 6 will let the wheel associated with that deactivated motor unit 6 free to rotate. Such a freely rotatable wheel will cause unbalance of driving between left and right sides and/or between rear and front sides, thus affecting straight-driving performance of the vehicle. Hence, it is preferred that not only a drive current to one motor unit 6 but also a drive current to one or more of the other motor units 6 are also shut off, to realize a stable travel which does not affect straight-driving performance of the vehicle.

In the present invention, the malfunction detector 37 and the malfunction-responsive controller 38 may be included in the inverter unit 22. The ECU 21 tends to get complicated, due to increasing sophistication of vehicle controls. With a configuration of a malfunction detector 37 and a malfunction-responsive controller 38 being included in the inverter unit 22, the complexity of the ECU 21 can be alleviated. A configuration of a malfunction detector 37 and a malfunction-responsive controller 38 being included in the inverter unit 22 is also advantageous in terms of wire routing, since the motor unit 6 is closer to the inverter unit 22 than to the ECU 21.

In the present invention, the motor unit 6, the malfunction detector 37 and the malfunction-responsive controller 38 may be configured such that two malfunction detectors 37 are assigned to one motor unit 6, and the malfunction-responsive controller 38 may be either configured to cause malfunction-responsive control which includes shut-off of a drive current to the motor unit 6 or braking with the mechanical brake 9, 10, only if both of the two malfunction detectors 37 detect a malfunction or configured to cause the malfunction-responsive control if one of the two malfunction detectors 37 detects a malfunction. It may happen that the malfunction detector 37 itself is experiencing abnormalities. With two malfunction detectors 37, however, reliability and precision of detecting a malfunction can be enhanced.

In the present invention, the motor unit 6, the malfunction detector 37 and the malfunction-responsive controller 38 may be configured such that at least three malfunction detectors 37 are assigned to one motor unit 6, and the malfunction-responsive controller 38 may be configured to cause malfunction-responsive control which includes shut-off of a drive current to the motor unit 6 or braking with the mechanical brake 9, 10, if at least one half of the at least three malfunction detectors 37 detect a malfunction. With a configuration of determining a malfunction if at least one half of at least three malfunction detectors 37 detect a malfunction, reliability and precision of detecting a malfunction can be enhanced.

In the present invention, the motor unit 6, together with a wheel bearing unit 4 and a reducer unit 7 interposed between the wheel bearing unit 4 and the motor unit 6, may form an in-wheel motor drive system 8. With an in-wheel motor drive system 8, wheels 2, 3 may be driven independently of each other. Such a configuration, however, may worsen how a malfunction of a motor unit 6 could affect stable travel of the vehicle. Malfunction detection and malfunction-responsive control provided by the present invention can be more effective in such a situation.

In the present invention, the reducer unit 7 may comprise a cycloidal reducer. A cycloidal reducer can achieve an excellent reduction ratio with a smooth operation. In a configuration in which torque is transmitted to a wheel 2, 3 by a reducer unit 7 having a significant reduction ratio, torque generated by an unstably controlled motor unit may be amplified and transmitted to the wheel 2, 3. Malfunction detection and malfunction-responsive control provided by the present invention can be more effective in such a situation.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
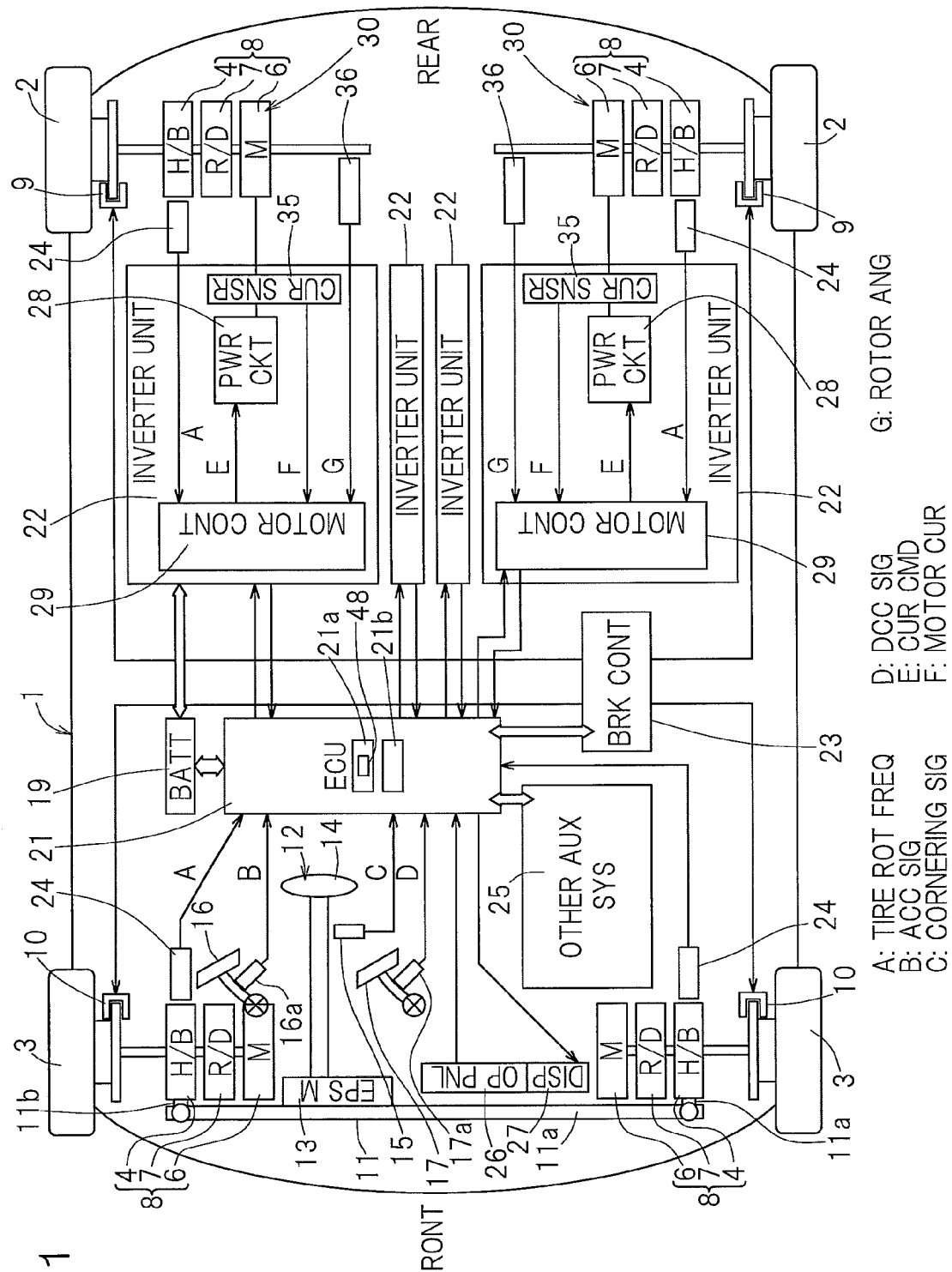
FIG. 1 is a block diagram of a schematic configuration of an electric vehicle, as viewed from top, according to an embodiment of the present invention.

One embodiment of the present invention will now be described in connection with FIG. 1 to FIG. 10. The illustrated electric vehicle is a four-wheel-drive vehicle that includes a vehicle body 1 with left and right rear wheels 2 and left and right front wheels 3, with both of the rear wheels 2 and front wheels 3 being drive wheels 3. The front wheels 3 are steered wheels. The wheels 2, 3, both equipped with tires, are supported by the vehicle body 1 via respective wheel bearing units 4. In FIG. 1, the wheel bearing units 4 are labeled with "H/B" which is an abbreviation for hub bearing. The wheels 2, 3 are driven by respective independent traction motor units 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8. The in-wheel motor drive system 8 is partly or entirely disposed within the wheel 2. The in-wheel motor drive system 8, together with an inverter unit 22 which will be discussed later, forms an in-wheel motor unit 30. The wheels 2, 3 are equipped with respective electrically driven mechanical friction brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 4 and also includes a tie rod structure 11a configured to be laterally displaced to change the angles of the left and right knuckle arms 11b, 11b. The lateral movement of the turning mechanism 11 may be caused by a signal from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right wheels.

A control system will be briefly discussed. The illustrated vehicle body 1 is equipped with an ECU 21 which is a primary electronic control unit configured to perform general control of the vehicle, a plurality of inverter units 22 (four inverter units 22 in the illustrated example) configured to perform control of the respective traction motor units 6 according to commands from the ECU 21, and a braking controller unit 23. The ECU 21 may include a computer, programs that may be executed by the computer, and various electronic circuits. The ECU 21 and/or other computer(s) may include a microcomputer.

The ECU 21 may be generally divided, in terms of their functions, into a drive control subunit 21a that performs drive-related controls and a general control subunit 21b that performs other controls. The drive control subunit 21a may include a torque allocator 48 that is configured to generate an accelerating/decelerating command in the form of a torque command value, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. The torque allocator 48 may be configured to, in response to a decelerating signal produced from the brake manipulation unit 17, generate a braking torque command allocated to regenerative braking of the motor unit 6 and a braking torque command allocated to the operation of the mechanical brakes 9, 10. The braking torque command allocated to regenerative braking is taken into account in the generation of the accelerating/decelerating command in the form of a torque command value, which will influence the traction motor units 6, 6. The braking torque command allocated to the operation of the mechanical brakes 9, 10 is sent to the braking controller unit 23.

In addition, the torque allocator 48 may be configured to correct the accelerating/decelerating command, based on information indicating the rotational frequency of tire(s) produced from rotation sensor(s) 24 that is/are operatively associated with the wheel bearing units 4 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23, which may include electronic circuits and/or a microcomputer, is configured to send a braking command to the mechanical brakes 9, 10 equipped to the wheels 2, 3, according to commands related to braking received from the ECU 21. Commands related to braking produced from the primary ECU 21 may include, other than commands generated based on the decelerating signal produced from the brake manipulator unit 17, a command generated by a safety enhancement subunit that may be included in the ECU 21. The braking controller unit 23 may also include an anti-lock-braking system.

The inverter unit 22 includes a power circuitry 28, which may be provided one for each of the motor units 6, and a motor control circuitry 29 configured to control the power circuitry/circuitries 28. A motor control circuitry 29 may be configured to send various information related to the in-wheel motor drive system 8 (which may be referred to as "IWM system information") held by the motor control circuitry 29, such as a variety of detected values or various control values, to the ECU 21.

Figure 2:
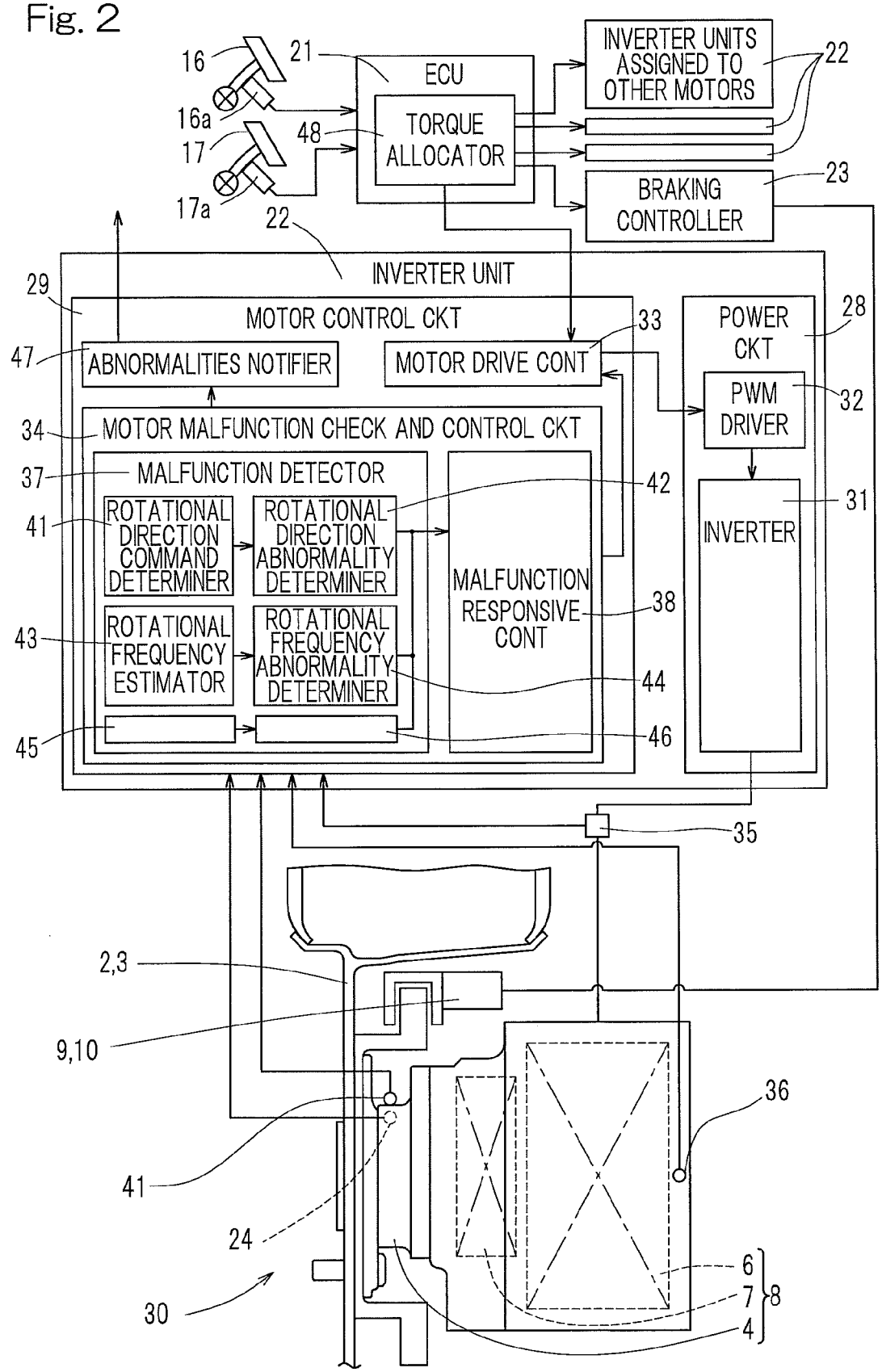
FIG. 2 is a block diagram of a schematic configuration of an in-wheel motor unit for the electric vehicle.

FIG. 2 is a block diagram of a schematic configuration of the in-wheel motor unit 30. The power circuitry 28 of the illustrated inverter unit 22 includes an inverter 31 configured to convert a DC power from a battery unit 19 (FIG. 1) into a three-phase AC power used to drive the motor unit 6 and also includes a PWM driver 32 configured to control the inverter 31. The motor unit 6 may include a three-phase synchronous motor such as an IPM (Interior Permanent Magnet) synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may be configured to receive the accelerating/decelerating command such as a torque command from the ECU 21 which serves as an upper-level control unit, convert the accelerating/decelerating command into a current command, and send the current command to the PWM driver 32 of the power circuitry 28. The motor control circuitry 29 may be configured to obtain a motor current that flows from the inverter 31 to the motor unit 6, with a current sensor 35, and perform a current feedback control. A rotational angle of a motor rotor in the motor unit 6 may be obtained, with an angle sensor 36, to carry out such a feedback current control based on the obtained rotational angle, such as a vector control.

In the embodiment under discussion, the motor control circuitry 29 may include a motor malfunction check and control circuit 34 and an abnormalities notifier 47, and the motor malfunction check and control circuit 34 may include a malfunction detector 37 and a malfunction-responsive controller 38, as described below.

The abnormalities notifier 47 may be configured to send, if the malfunction detector 37 detects a malfunction and/or if the malfunction-responsive controller 38 performs an operation responsive to a malfunction, signals notifying the malfunction detection and/or the malfunction-responsive operation, to the ECU 21. The ECU 21 may include a sub-unit (not shown) configured to perform an appropriate control in response to the notification from the abnormalities notifier 47 and/or may include a sub-unit (not shown) configured to cause a display 27 on a console to show a presentation that indicates a driver of such abnormalities and/or indicates a driver that such an appropriate control has been performed or is being performed.

The malfunction detector 37 may be configured to continuously monitor a torque command from the ECU 21 as well as one of the followings: signals indicating a rotational frequency of the motor unit 6; signals indicating a rotational frequency of the wheel 2, 3 driven by the motor unit 6; signals indicating a rotational direction of the motor unit 6; signals indicating a rotational direction of the wheel 2, 3 driven by the motor unit 6; and a motor current, and detect, according to a predefined rule, a malfunction of the motor unit 6, based on the monitoring information. Signals indicating a rotational frequency of a wheel 2, 3 as well as signals indicating a rotational direction of the wheel 2, 3 may be obtained from the output of an angle sensor 36 that may be configured to sense a rotational angle of a motor rotor in the motor unit 6 or obtained from the output of a rotation sensor 24 that may be operatively associated with the wheel bearing unit 4. The rotation sensor 24 may be configured to determine a rotational direction, for output, to allow for obtaining signals indicating a rotational direction.

The malfunction-responsive controller 38 may be configured to cause at least one of shut-off of a drive current to the motor unit 6 and braking with the mechanical brake 9, 10, if the malfunction detector 37 detects a malfunction. The malfunction-responsive controller 38 may be configured to cause the motor drive controller 33 to shut off a drive current. The malfunction-responsive controller 38 may be configured to send a braking command to the braking controller unit 23 to cause braking with the mechanical brake 9, 10. The braking controller unit 23 may be configured to, in response to a braking command from the malfunction-responsive controller 38 in any one of the inverter units 22, cause all of the mechanical brakes 9, 10 that may be mounted to the vehicle to perform a braking operation.

Preferably, the malfunction-responsive controller 38 may be configured to cause, if a malfunction of one of the motor units 6 is detected, not only shut-off of a drive current to the motor unit 6 whose malfunction is detected but also shut-off of a drive current to one or more of the other motor units 6. Here, a drive current to all of the motor units 6 of the vehicle may be shut off. Out of the rear or front wheels, if one of them is equipped with a motor unit 6 whose malfunction is detected, a drive current to motor unit(s) 6 equipped to one or more of the other wheels 2, 3 of the same rear or front wheels may also be shut off. For example, out of the rear wheels 2, if a malfunction of the motor unit 6 equipped to a left wheel 2 is detected, the motor unit 6 equipped to a right wheel 2 of the same rear wheels 2 may also be deactivated.

The malfunction-responsive controller 38 may be configured to cause not only shut-off of a drive current to the motor unit 6 powered by the inverter unit 22 in which the malfunction-responsive controller 38 is included, but also shut-off of a drive current to one or more of the other motor units 6. Signals for such shut-off may be transmitted via the ECU 21. Signals for such shut-off may be directly transmitted between or among the inverter units 22.

In a configuration where signals for such shut-off may be transmitted via the ECU 21, the malfunction-responsive controller 38 may be configured to send to the ECU 21 signals indicating the detection of a malfunction or signals for shut-off of a drive current to one or more of the other motor units 6. The ECU 21 may include a different-motor(s)-control system 49 (FIG. 4) configured to, in response to the signals indicating the detection of a malfunction or the signals for shut-off of a drive current to the one or more of the other motor units 6, cause the corresponding inverter unit(s) 22 to command shut-off of a drive current to the one or more of the other motor units 6.

In a configuration where signals for such shut-off may be directly transmitted between or among the inverter units 22, the motor control circuitry 29 may include a system (not shown) configured to, upon receiving from a different inverter unit 22 signals for shut-off of a drive current, cause shut-off of a drive current to a motor unit 6 that operates under control of the motor control circuitry 29.

Figure 3:
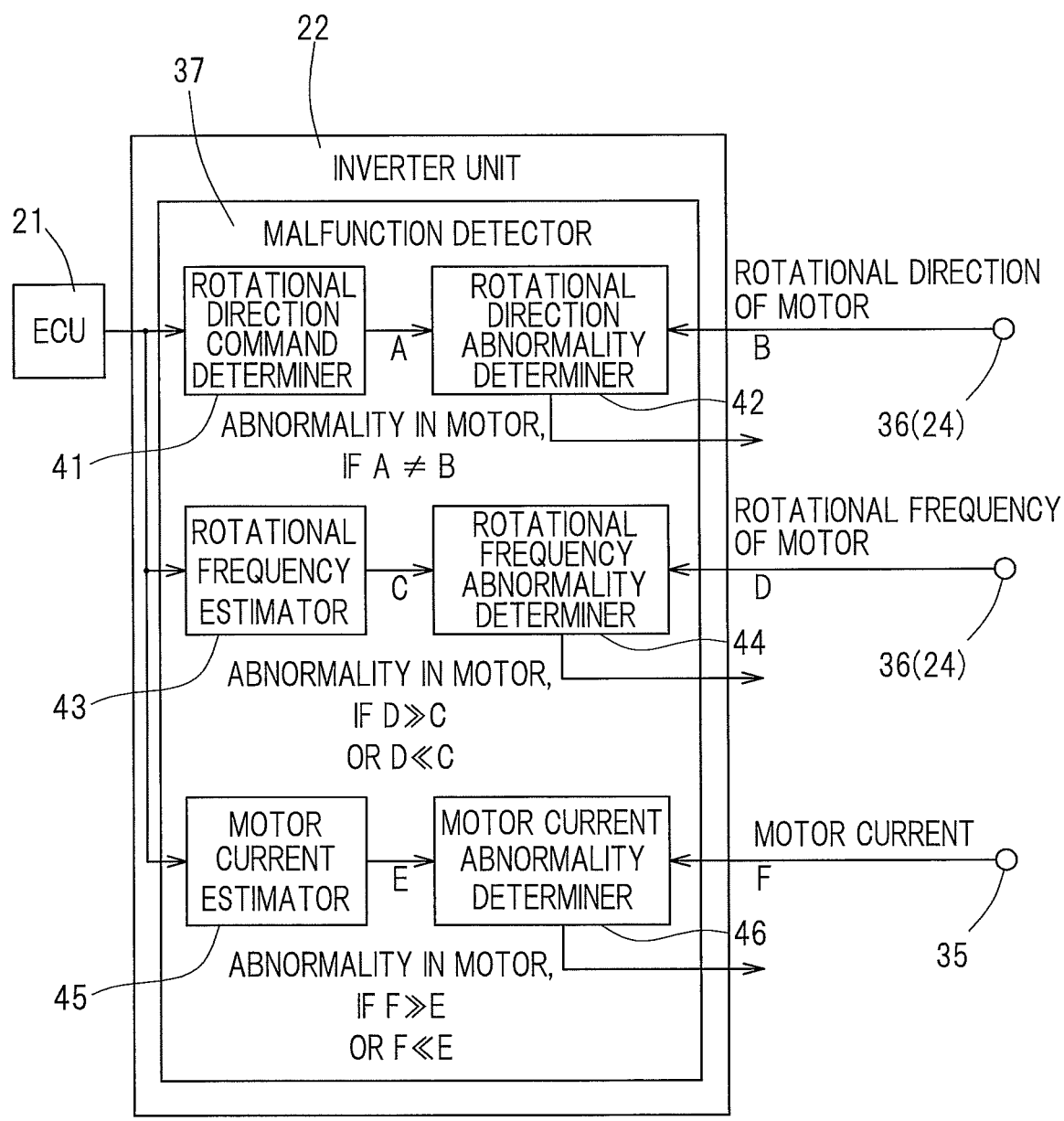
FIG. 3 is a block diagram of a schematic configuration of a malfunction detector for the electric vehicle.
Figure 4:
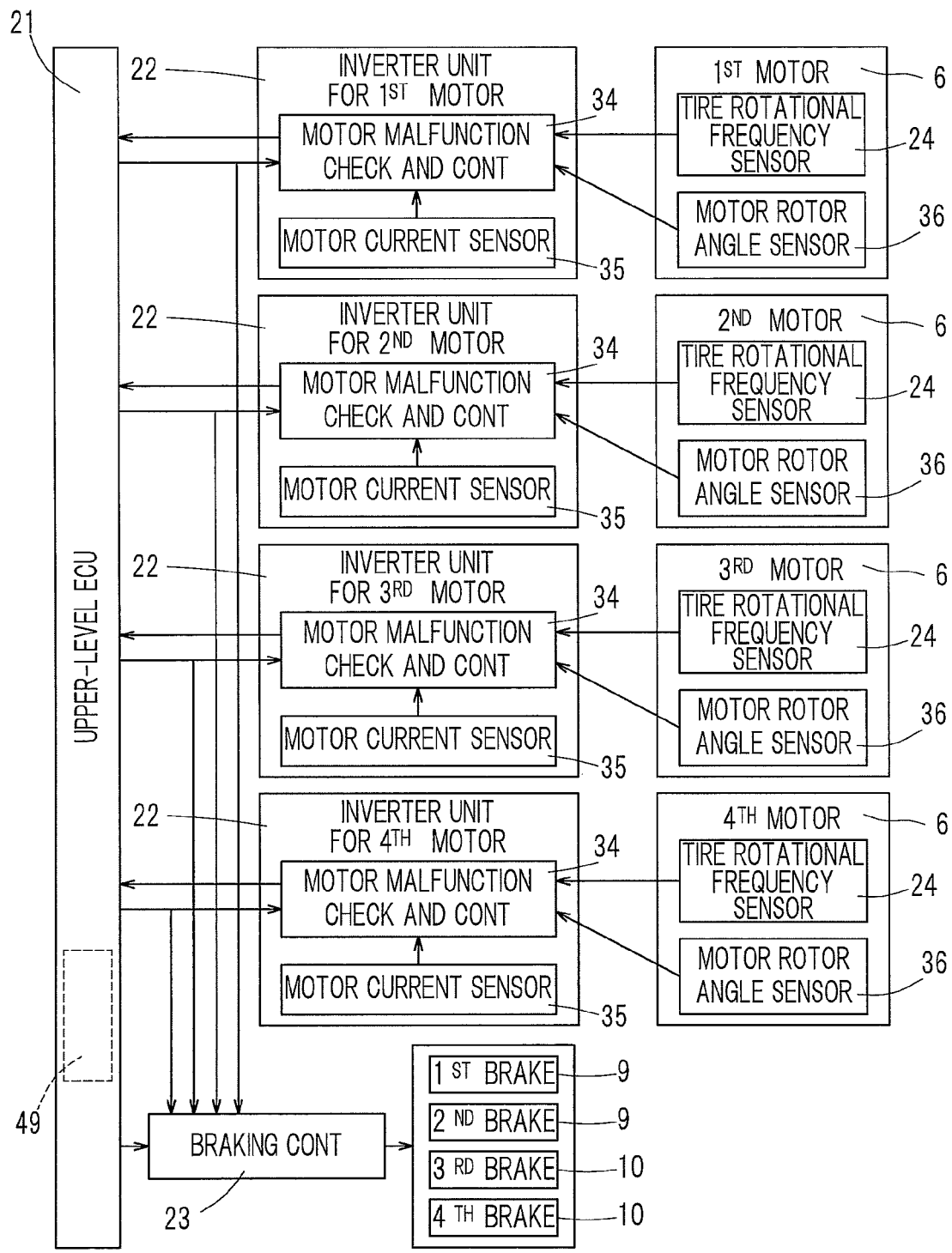
FIG. 4 is a block diagram of a schematic configuration of an ECU, inverter units and a motor malfunction check and control circuit in each of the inverter units, for the electric vehicle.

FIG. 3 shows a particular example of the malfunction detector 37. In this example, the malfunction detector 37 includes, as a circuitry to detect a malfunction of the motor unit 6 based on a rotational direction abnormality of the motor unit 6, a rotational direction command determiner 41 and a rotational direction abnormality determiner 42. The malfunction detector 37 also includes, as a circuitry to detect a malfunction of the motor unit 6 based on a rotational frequency abnormality of the motor unit 6, a rotational frequency estimator 43 and a rotational frequency abnormality determiner 44. The malfunction detector 37 also includes, as a circuitry to detect a malfunction of the motor unit 6 based on a motor current abnormality of the motor unit 6, a motor current estimator 45 and a motor current abnormality determiner 46.

The rotational direction command determiner 41 may be configured to determine, based on a torque command which is a drive command sent from the ECU 21 to the inverter unit 22, whether the rotational direction as commanded by the drive command from the ECU 21 is a positive or negative direction (i.e., forward or rearward travel of the vehicle). The rotational direction abnormality determiner 42 may be configured to compare the rotational direction A as commanded by the drive command from the ECU 21 which is determined by the rotational direction command determiner 41 with the actual rotational direction B of the motor unit 6, i.e., the rotational direction B as determined with the rotation sensor 24 (FIG. 2) or with the angle sensor 36 (FIG. 2), and to, if the rotational direction A and the rotational direction B are different, generate a determination result indicating an abnormality in the motor unit 6, for output.

The rotational frequency estimator 43 may be configured to estimate, based on a torque command which is a drive command sent from the ECU 21 to the inverter unit 22, an intended rotational frequency (i.e., an intended rotational speed) of the motor unit 6 according to the drive command from the ECU 21. The rotational frequency abnormality determiner 44 may be configured to compare the rotational frequency C estimated by the rotational frequency estimator 43 with the actual rotational frequency D of the motor unit 6, i.e., the rotational frequency D as determined with the rotation sensor 24 or with the angle sensor 36, and to, if the difference between the rotational frequency C and the rotational frequency D exceeds a threshold, generate a determination result indicating an abnormality in the motor unit 6, for output. The motor unit 6 may be determined to have an abnormality, whether the estimated rotational frequency C is significantly greater than the actual rotational frequency D of the motor unit 6, i.e., C>>D or the estimated rotational frequency C is significantly smaller than the actual rotational frequency D of the motor unit 6, i.e., C<<D. The aforementioned threshold for the difference between the rotational frequency C and the rotational frequency D which may be used to determine an abnormality in the motor unit 6 can be appropriately selected.

The motor current estimator 45 may be configured to estimate, based on a torque command which is a drive command sent from the ECU 21 to the inverter unit 22, an intended motor current in the motor unit 6 according to the torque command. The motor current abnormality determiner 46 may be configured to compare the motor current E estimated by the motor current estimator 45 with the actual motor current F in the motor unit 6, i.e., the motor current F as determined with the current sensor 35, and to, if the difference between the motor current E and the motor current F exceeds a threshold, generate a determination result indicating an abnormality in the motor unit 6, for output. The motor unit 6 may be determined to have an abnormality, whether the estimated motor current E is significantly greater than the actual motor current F in the motor unit 6, i.e., E>>F or the estimated motor current E is significantly smaller than the actual motor current F in the motor unit 6, i.e., E<<F. The aforementioned threshold for the difference between the motor current E and the motor current F which may be used to determine an abnormality in the motor unit 6 can be appropriately selected.

The following discussion deals with how a malfunction may be detected and how a control responsive to it may be carried out, in connection with the aforementioned configuration. Referring to FIG. 2, electromagnetic noise or electrostatic noise may affect the motor control circuitry 29. In such a case, a torque command from the ECU 21 may accidentally result in a malfunction of a motor unit 6, such as a rotational direction abnormality or a rotational speed abnormality.

The malfunction detector 37 may continuously monitor a torque command from the ECU 21 as well as one of the followings: signals indicating a rotational frequency of a motor unit 6; signals indicating a rotational frequency of a wheel 2, 3 driven by the motor unit 6; signals indicating a rotational direction of the motor unit 6; signals indicating a rotational direction of the wheel 2, 3 driven by the motor unit 6; and a motor current, and detect, according to a predefined rule, a malfunction of the motor unit 6, based on the monitoring information.

In particular, as described in connection with FIG. 3, the rotational direction command determiner 41 may determine, based on a torque command which is a drive command sent from the ECU 21 to the inverter unit 22, a rotational direction A as commanded by the torque command. The rotational direction abnormality determiner 42 may compare the rotational direction A with an actual rotational direction B of the motor unit 6 and, if the rotational direction A and the rotational direction B are different, generate a determination result indicating an abnormality in the motor unit 6, for output.

The rotational frequency estimator 43 may estimate, based on a torque command which is a drive command sent from the ECU 21 to the inverter unit 22, an intended rotational frequency of the motor unit 6 according to the torque command. The rotational frequency abnormality determiner 44 may compare the estimated rotational frequency C with an actual sensed rotational frequency D of the motor unit 6 and, if the difference between the rotational frequency C and the rotational frequency D exceeds a threshold, generate a determination result indicating an abnormality in the motor unit 6, for output.

The motor current estimator 45 may estimate, based on a torque command sent from the ECU 21 to the inverter unit 22, an intended motor current in the motor unit 6 according to the torque command. The motor current abnormality determiner 46 may compare the estimated motor current E with an actual sensed motor current F and, if the difference between the motor current E and the motor current F exceeds a threshold, generate a determination result indicating an abnormality in the motor unit 6, for output.

In response to the output of the malfunction detector 37 which may include any one of the aforementioned determination results indicating an abnormality in the motor unit 6, the malfunction-responsive controller 38 such as shown in FIG. 2 may cause malfunction-responsive control which includes at least one of shut-off of a drive current to the motor unit 6 and braking with the mechanical brake 9, 10. Braking with the mechanical brake 9, 10 may include braking all wheels 2, 3 with mechanical brakes 9, 10 equipped to the wheels 2, 3, or braking rear or front wheels with mechanical brakes 9, 10 equipped to the rear or front wheels. Preferably, shut-off of a drive current to the motor unit 6 includes simultaneously shutting off a drive current to the motor unit 6 whose malfunction is detected and to one or more of the other motor units 6, as discussed earlier.

In this way, a malfunction of a motor unit 6, such as caused by noise in a control system can be quickly detected and fail-safe safety measures can be correspondingly taken which may include shutting off of the supply of a motor current. Thus, safety can be quickly established by, for example, preventing travel of a vehicle in a direction opposite to a driver's intended direction and/or a driver's unintended acceleration of a vehicle.

The abnormalities notifier 47 may notify, if control responsive to a malfunction detected by the malfunction detector 37 is performed, the ECU 21 that such a malfunction-responsive control has been or is being carried out. In response to such a notification, the ECU 21 may perform a predetermined, appropriate control to achieve a coordinated control of the vehicle in general, while causing a display 27 on a console to show a presentation indicating a driver of such abnormalities in a motor unit 6 and/or a presentation indicating the driver that control responsive to such abnormalities has been performed or is being performed. A presentation indicating such abnormalities may be caused to be shown, in response to signals indicating that the malfunction detector 37 has detected such abnormalities.

In the aforementioned example, a pair of the rotational direction command determiner 41 and the rotational direction abnormality determiner 42, a pair of the rotational frequency estimator 43 and the rotational frequency abnormality determiner 44, and a pair of the motor current estimator 45 and the motor current abnormality determiner 46, i.e., three pairs in total, are provided. However, only one pair or two pairs out of these three pairs may be provided.

Figure 5:
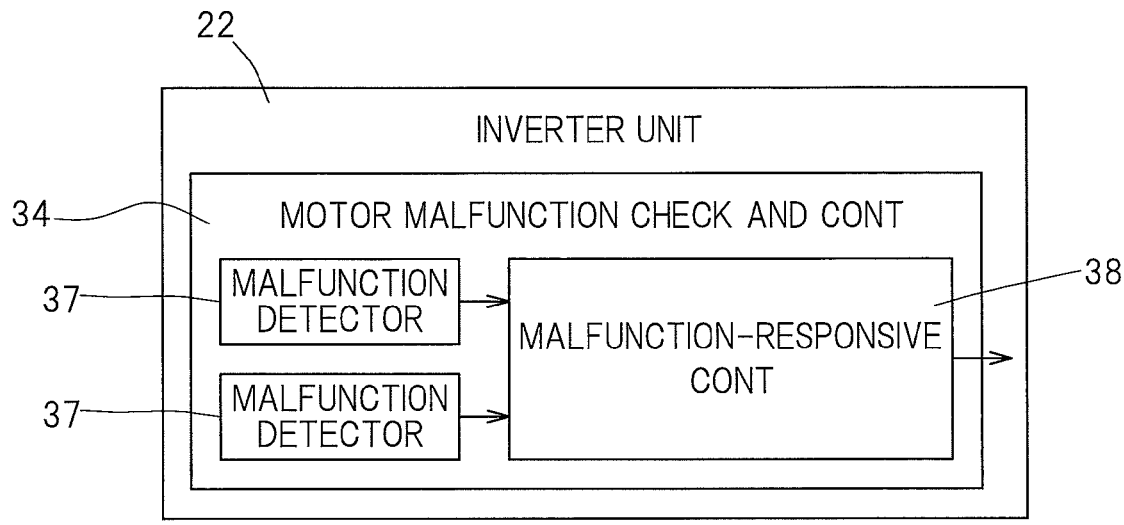
FIG. 5 is a block diagram of a schematic configuration of a variant of the motor malfunction check and control circuit for the electric vehicle.

In the aforementioned example, a motor malfunction check and control circuit 34 in each of the inverter units 22 includes only one malfunction detector 37. However, a motor malfunction check and control circuit 34 may include two malfunction detectors 37, such as shown in FIG. 5. In such a case, the malfunction-responsive controller 38 may cause malfunction-responsive control which includes shut-off of a drive current to the motor unit 6 or braking with the mechanical brake 9, 10, only if both of the two malfunction detectors 37 detect a malfunction or may cause the malfunction-responsive control if one of the two malfunction detectors 37 detects a malfunction. It may happen that a malfunction detector 37 itself is experiencing abnormalities. With two malfunction detectors 37, however, reliability and precision of detecting a malfunction can be enhanced.

Figure 6:
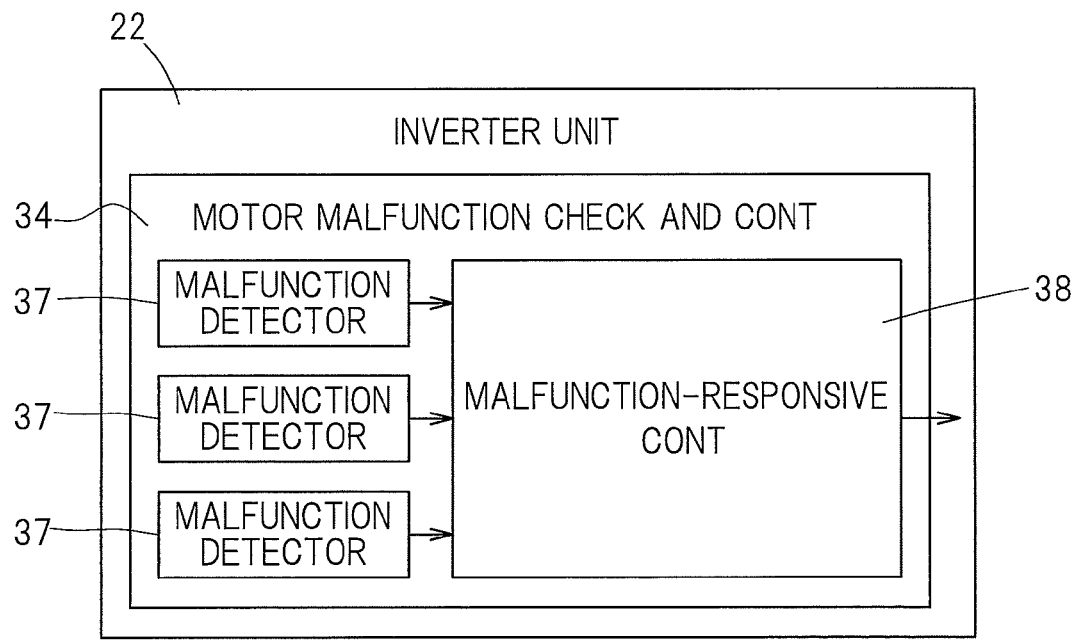
FIG. 6 is a block diagram of a schematic configuration of another variant of the motor malfunction check and control circuit for the electric vehicle.

Three malfunction detectors 37 may be assigned to one motor unit 6, such as shown in FIG. 6. In such a case, the malfunction-responsive controller 38 may cause the aforementioned malfunction-responsive control, if at least one half of the at least three malfunction detectors 37 detect a malfunction. With a configuration of determining a malfunction if at least one half of at least three malfunction detectors 37 detect a malfunction, reliability and precision of detecting a malfunction can be enhanced.

Malfunction detectors 37 in examples such as shown in FIG. 5 and FIG. 6 may have configurations such as that described in connection with FIG. 3. The malfunction-responsive controller 38 in examples such as shown in FIG. 5 and FIG. 6 may be configured not to perform malfunction-responsive control if one of the illustrated malfunction detectors 37 detects a malfunction but one or more of the other malfunction detectors 37 do not detect a malfunction. The abnormalities notifier 47 such as shown in FIG. 2 may be configured to notify the ECU 21 of such a situation, and the ECU 21 may be configured to cause a display 27 such as shown in FIG. 1 to show a presentation indicating such a situation. Furthermore, malfunction detectors 37 in examples such as shown in FIG. 5 and FIG. 6 may include malfunction detectors 37 with the same configurations or may include malfunction detectors 37 with different configurations.

Referring to FIG. 7 to FIG. 10, the following discussion deals with a particular example of the aforementioned in-wheel motor drive system 8. The illustrated in-wheel motor drive system 8 includes a wheel bearing unit 4, a motor unit 6 and a reducer unit 7 interposed between the wheel bearing unit 4 and the motor unit 6, in which the hub of a drive wheel 2 supported by the wheel bearing unit 4 is coaxially coupled with a rotational output shaft 74 of the motor unit 6. The reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

Figure 8:
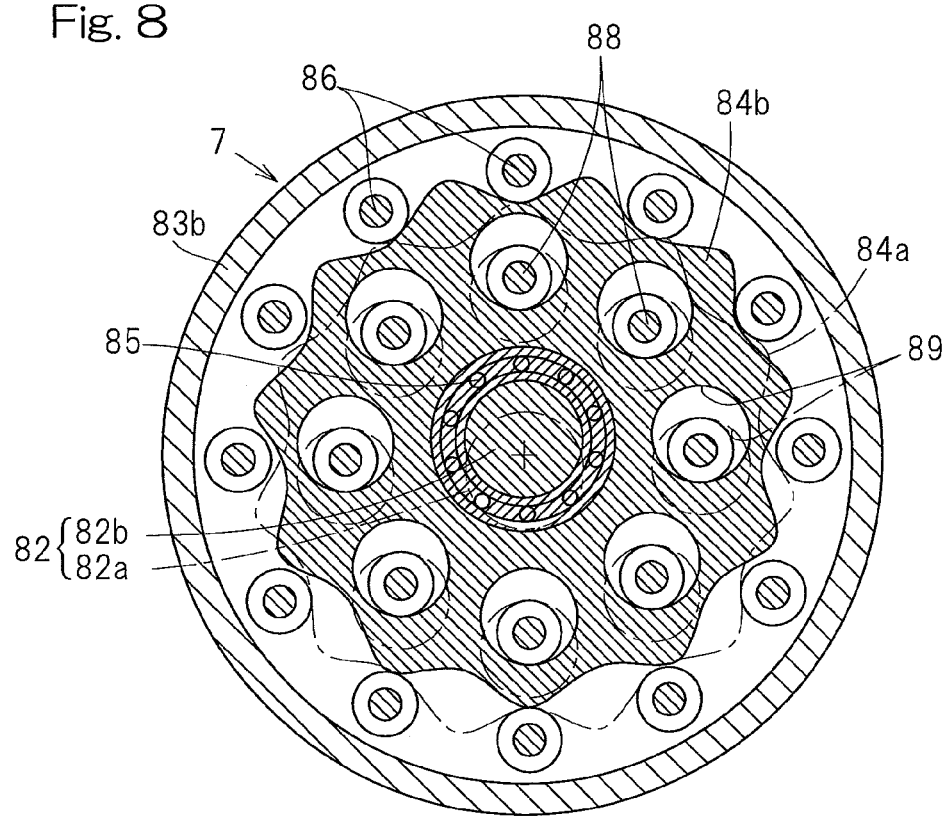
FIG. 8 is a cross sectional view of FIG. 7, taken along the line VIII-VIII.

The illustrated reducer unit 7 includes a cycloidal reducer as described. As shown in FIG. 8, the cycloidal reducer includes two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 1/10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 9:
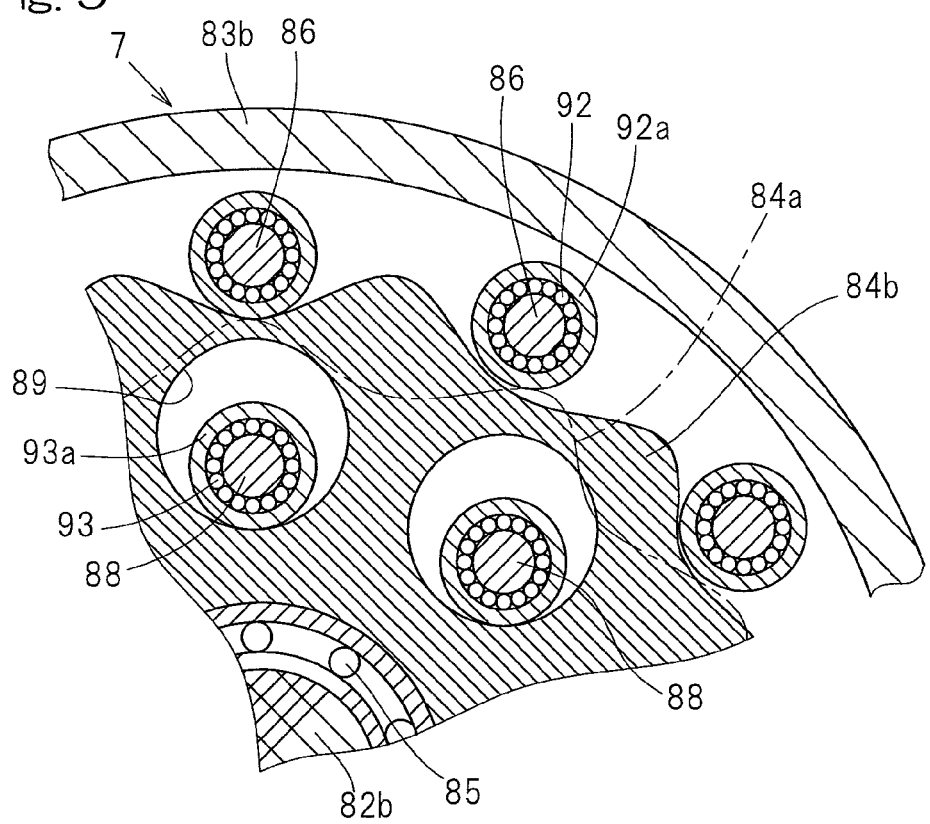
FIG. 9 is a fragmentary enlarged cross sectional view of FIG. 8.

As shown on an enlarged scale in FIG. 9, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

Figure 7:
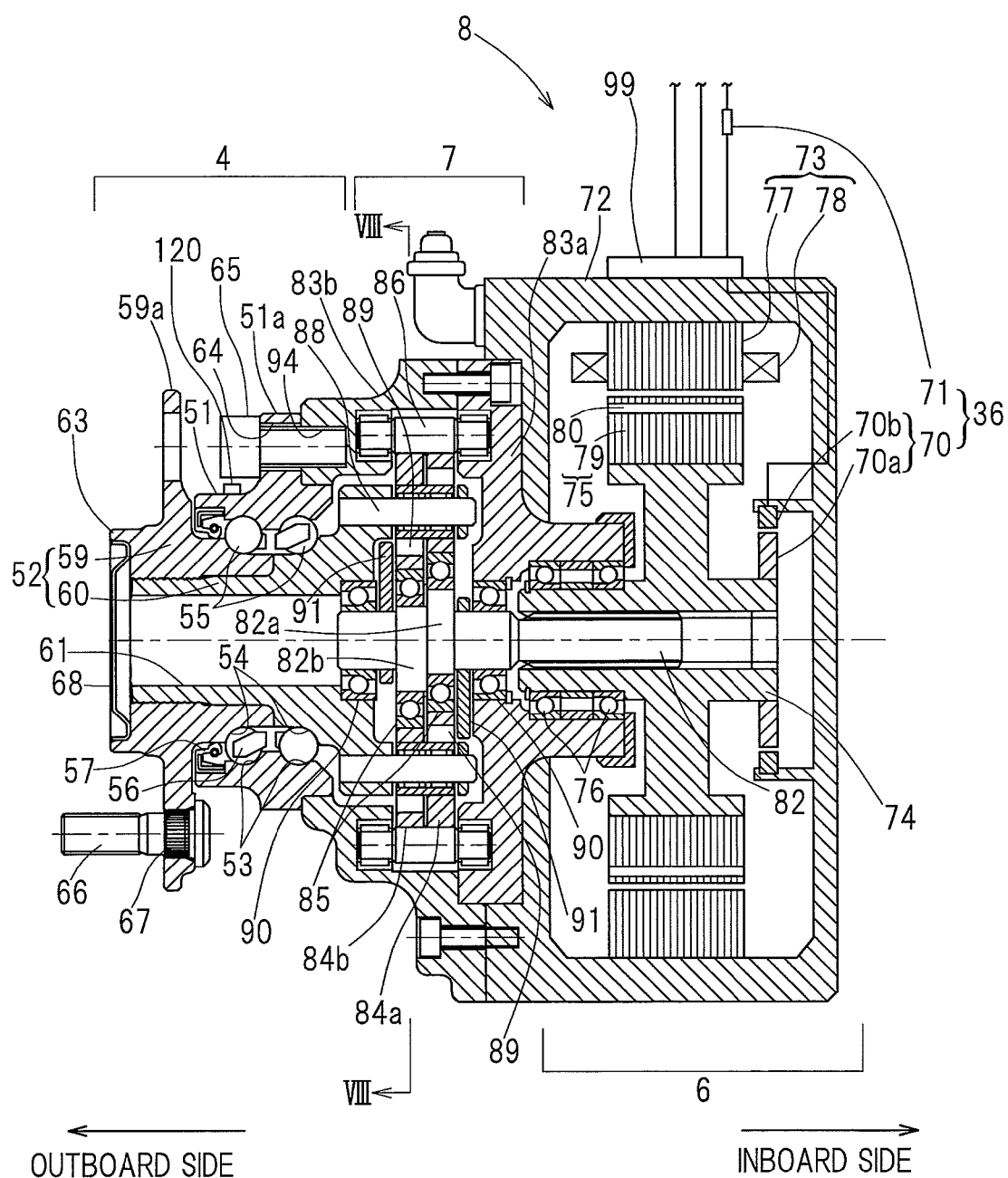
FIG. 7 is a front cut-away view of an in-wheel motor drive system for the electric vehicle.

The motor unit 6 as shown in FIG. 7 includes a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7.

The motor stator 73 includes a stator core body 77 made of soft magnetic material and also includes coils 78. An outer peripheral surface of the stator core body 77 is fitted to the inner peripheral surface of the motor housing 72. In this way, the stator core body 77 is supported by the motor housing 72. The motor rotor 75 includes a rotor core body 79 mounted onto the rotational output shaft 74 to be coaxial with the motor stator 73 and also includes a plurality of permanent magnets 80 incorporated in the rotor core body 79.

The motor unit 6 may be associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70.

The angle sensor body 70 includes a detectable element 70a associated with the outer peripheral surface of the rotational output shaft 72 and also includes a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. Here, the angle sensor 36 may include a magnetic encoder or a resolver. Control of the rotation of the motor unit 6 may be carried out by the aforementioned motor control circuitry 29 (e.g., see FIG. 1 and FIG. 2). To maximize the efficiency of the illustrated motor unit 6, the motor drive controller 33 of the motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 10:
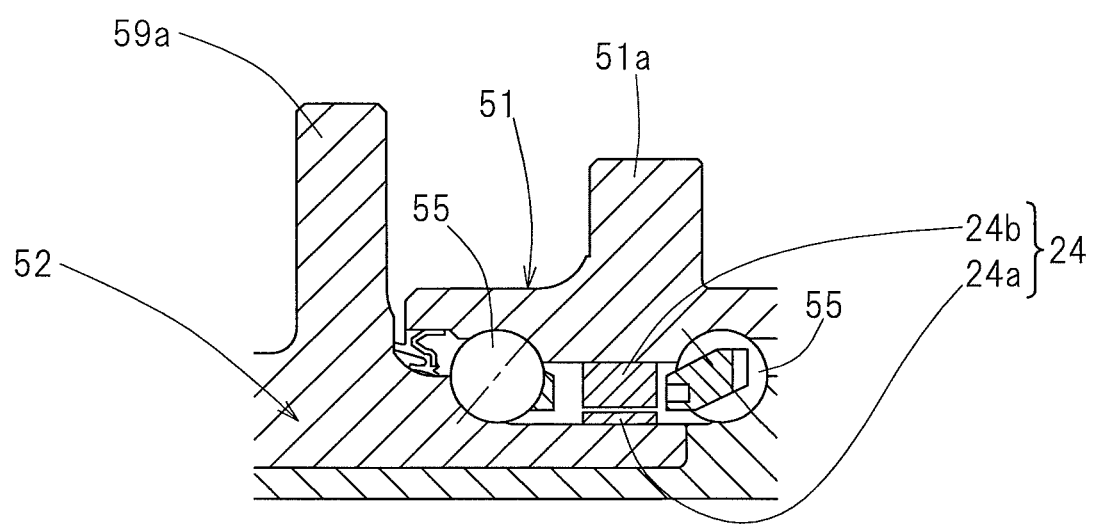
FIG. 10 is a longitudinal cross sectional view of an example of a rotation sensor for the electric vehicle.

FIG. 10 illustrates an example of a rotation sensor 24 such as shown in FIG. 1 and FIG. 2. The illustrated rotation sensor 24 includes a magnetic encoder 24a associated with an outer periphery of the inner member 52 of the wheel bearing unit 4 and also includes a magnetic sensor 24b associated with the outer member 51 in face-to-face relation with the magnetic encoder 24a. The magnetic encoder 24a may include a ring-shaped member magnetized with N poles and S poles that alternate with each other along a circumferential direction of the ring-shaped member. In the illustrated example, the rotation sensor 24 is positioned between the double rows of rolling elements 55, 55. In other embodiments, the rotation sensor 24 may be positioned at an end of the wheel bearing unit 4.

In the aforementioned embodiment(s) such as shown in FIG. 1 and FIG. 2, the ECU 21 and the inverter unit 22 are provided separate from each other. However, the ECU 21 and the inverter unit 22 may be included in the same computer.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Vehicle body
2, 3: Wheel
4: Wheel bearing unit
6: Motor unit
7: Reducer unit
8: In-wheel motor drive system
9, 10: Mechanical brake
21: ECU
22: Inverter unit
24: Rotation sensor
28: Power circuitry
29: Motor control circuitry 30: In-wheel motor unit
31: Inverter
32: PWM driver
33: Motor drive controller
34: Motor malfunction check and control circuit
35: Current sensor
36: Angle sensor
37: Malfunction detector
38: Malfunction-responsive controller
41: Rotational direction command determiner
42: Rotational direction abnormality determiner
43: Rotational frequency estimator
44: Rotational frequency abnormality determiner
45: Motor current estimator
46: Motor current abnormality determiner
47: Abnormalities notifier

What is claimed is:

1. An electric vehicle comprising:
   a motor unit configured to drive a wheel;
   an ECU which is an electronic control unit configured to perform general control of the vehicle;
   an inverter unit, the inverter unit including:
      a power circuitry including an inverter configured to convert a DC power from a battery unit into an AC power used to drive the motor unit; and
      a motor control circuitry configured to control the power circuitry in accordance with a torque command from the ECU;
   a mechanical brake configured to brake the wheel;
   a malfunction detector configured to continuously monitor the torque command from the ECU as well as one of the following: signals indicating a rotational frequency of the motor unit; signals indicating a rotational frequency of the wheel driven by the motor unit; signals indicating a rotational direction of the motor unit; signals indicating a rotational direction of the wheel driven by the motor unit; and a motor current, and detect, according to a predefined rule, a malfunction of the motor unit, based on the monitoring information; and
   a malfunction-responsive controller configured to cause at least one of shut-off of a drive current to the motor unit and braking with the mechanical brake, if the malfunction detector detects a malfunction,
   wherein the motor unit comprises a plurality of motor units configured to drive respective different wheels and the malfunction-responsive controller is configured to cause, if a malfunction of one of the motor units is detected, not only shut-off of a drive current to the motor unit whose malfunction is detected but also shut-off of a drive current to one or more of the other motor units.

2. The electric vehicle as claimed in claim 1, wherein the malfunction detector includes a rotational direction command determiner configured to determine, based on the torque command from the ECU, an intended rotational direction of the motor unit and a rotational direction abnormality determiner configured to compare the intended rotational direction with a rotational direction determined based on one of the following: signals indicating a rotational frequency of the motor unit; signals indicating a rotational frequency of the wheel driven by the motor unit; signals indicating a rotational direction of the motor unit; signals indicating a rotational direction of the wheel driven by the motor unit; and a motor current, to determine a rotational direction abnormality of the motor unit.

3. The electric vehicle as claimed in claim 1, wherein the malfunction detector includes a rotational frequency estimator configured to determine, based on the torque command from the ECU, an intended rotational frequency of the motor unit and a rotational frequency abnormality determiner configured to compare the intended rotational frequency with one of the following: signals indicating a rotational frequency of the motor unit; and signals indicating a rotational frequency of the wheel driven by the motor unit, to determine a rotational frequency abnormality of the motor unit.

4. The electric vehicle as claimed in claim 1, wherein the malfunction detector and the malfunction-responsive controller are included in the inverter unit.

5. The electric vehicle as claimed in claim 1, wherein the motor unit, the malfunction detector and the malfunction-responsive controller are configured such that two malfunction detectors are assigned to one motor unit, and the malfunction-responsive controller is either configured to cause malfunction-responsive control which includes shut-off of a drive current to the motor unit or braking with the mechanical brake, only if both of the two malfunction detectors detect a malfunction or configured to cause the malfunction-responsive control if one of the two malfunction detectors detects a malfunction.

6. The electric vehicle as claimed in claim 1, wherein the motor unit, the malfunction detector and the malfunction-responsive controller are configured such that at least three malfunction detectors are assigned to one motor unit, and the malfunction-responsive controller is configured to cause malfunction-responsive control which includes shut-off of a drive current to the motor unit or braking with the mechanical brake, if at least one half of the at least three malfunction detectors detect a malfunction.

7. The electric vehicle as claimed in claim 1, wherein the motor unit, together with a wheel bearing unit and a reducer unit interposed between the wheel bearing unit and the motor unit, forms an in-wheel motor drive system.

8. The electric vehicle as claimed in claim 7, wherein the reducer unit comprises a cycloidal reducer.

* * * * *